No. 687,778. Patented Dec. 3, 1901.
S. R. PATTEN.
SAFETY HOOK OR LINK FOR CHAINS, &c.
(Application filed Sept. 30, 1901.)
(No Model.)

Witnesses
J. G. Hinkel
F. R. Hinkel

Inventor
Simon R. Patten,
By Foster & Freeman,
Attorneys

UNITED STATES PATENT OFFICE.

SIMON RICE PATTEN, OF OMAHA, NEBRASKA.

SAFETY HOOK OR LINK FOR CHAINS, &c.

SPECIFICATION forming part of Letters Patent No. 687,778, dated December 3, 1901.

Application filed September 30, 1901. Serial No. 77,083. (No model.)

*To all whom it may concern:*

Be it known that I, SIMON RICE PATTEN, a citizen of the United States, residing at Omaha, in the county of Douglas and State of Nebraska, have invented certain new and useful Improvements in Safety Hooks or Links for Chains, &c., of which the following is a specification.

My invention relates to safety hooks or links for chains, &c., its object being to improve the structure of such devices.

The invention will be fully described hereinafter, reference being had to the accompanying drawings, in which—

Figure 1:
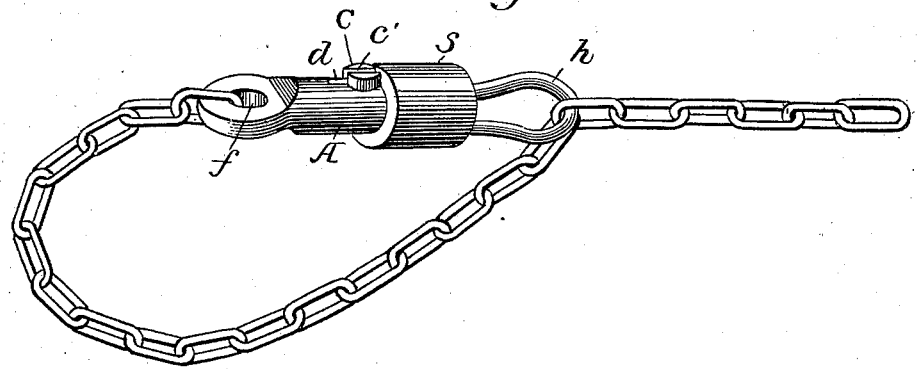
Figure 2:
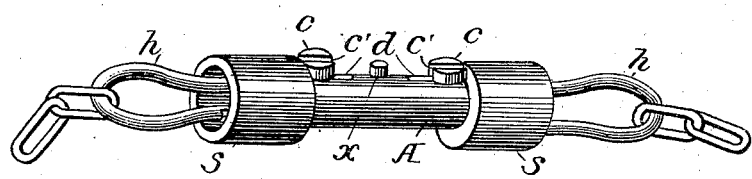
Figure 3:
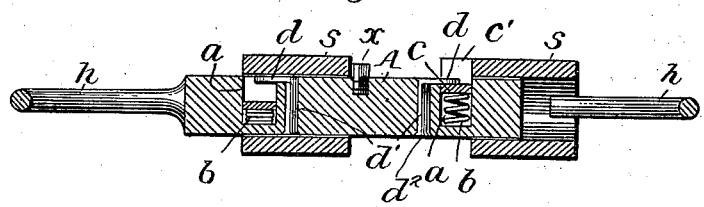
Figure 4:
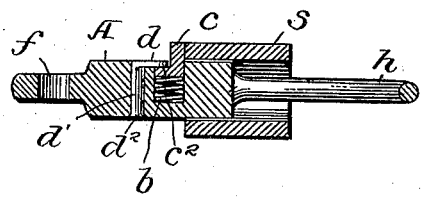

Figure 1 is a perspective view of a piece of chain with a safety-hook embodying my invention. Fig. 2 is a similar view of two pieces of chain connected by a safety-link made in accordance with my invention. Fig. 3 is a longitudinal section of the link shown in Fig. 2. Fig. 4 is a sectional view of a modification.

I use the terms "link" and "hook" to distinguish between the uses to which my invention may be applied. A hook is usually connected permanently to one link of a chain or to a rope and may be detachably engaged with any other link of the chain or to a loop in the rope. A "link," as I use the term in the present case, is a device to connect two pieces of chain or two pieces of rope together, but detachable from both pieces. Whether the device is a link or a hook there is a solid bar A, which may be of any desired shape cross-sectionally, and this bar is provided with either one or two recesses $a$, one when the device is used as a hook and two when it is used as a link. In each recess $a$ is a spring $b$, upon which a pin $c$ is supported. As shown in Figs. 1, 2, and 3, the outer portion of the pin is slotted, as indicated by $c'$, to receive an arm $d$, extending parallel with the bar A and secured to the latter in any desired manner. Preferably I bore a hole through the bar A and insert a pin $d'$ therein, said pin being bent at a right angle to form the arm $d$. The pin $d'$ can be secured in the hole by burring, as indicated at $d^2$, or otherwise. As shown in Fig. 4, the outer end of the pin $c$ is halved out to form a shoulder $c^2$, over which the arm $d$ projects. In either case the pin $c$ is prevented from leaving the recess $a$ under the influence of the spring $b$.

In Fig. 1 one end of the bar A is flattened and provided with an opening $f$ to receive a link of a chain, or such opening may receive a rope, or it may be elongated to receive a strap. At the other end of the bar is a hook $h$, with its open end adjacent to the bar A. A sleeve $s$ is fitted to slide upon the bar A and over the open end of the hook to close the latter. The outward movement of the sleeve is limited by the diverging sides of the hook, and the parts are so proportioned that when the sleeve is at its outermost position on the bar and hook the pin $c$ will form a stop for the inner end of the sleeve, as shown in Fig. 3, and obviously by depressing the pin $c$ the sleeve may be moved inwardly on the bar A to expose the open end of the hook, and when so moved the outer end of the pin $c$ will bear against the inner surface of the sleeve and cause sufficient friction to hold the sleeve in that position.

In Figs. 2 and 3 each end of the bar is provided with a hook, and two sleeves $s$ and two pins $c$ are employed. With this construction the device may be used as a hook, the same as the device shown in Fig. 1, and may also be used as a link to connect two pieces of chain without necessitating the permanent attachment of either piece of chain to it. In order to limit the inward movement of the sleeves, the bar A will preferably be provided with a stop $x$, with which the inner ends of the sleeves may engage.

Without limiting myself to the precise details of construction illustrated and described, I claim—

1. In a device of the class described, a bar having a recess between its ends, and a hook projecting from one end with its open end adjacent to the bar, combined with a sleeve slidably supported upon the bar and its outer end adapted to close the open end of the hook, a spring-supported pin in said recess to form a stop for the inner end of the sleeve, and an arm secured to the bar and projecting over the pin to hold the latter in its recess, substantially as set forth.

2. In a device of the class described, a bar having two recesses formed in it at points remote from its respective ends, and having a hook projecting from each end, the open ends of said hooks being adjacent to the respective ends of the bar, sleeves slidably supported upon the bar and movable in opposite directions to close the open ends of the hooks, spring-supported pins in said recesses to form stops respectively for the inner ends of the sleeves, a stop on the bar between the recesses with which the inner ends of the sleeves may engage, and arms secured to the bar and projecting over the pins to hold the latter in their recesses, substantially as set forth.

3. In a device of the class described, a bar having a recess between its ends, a hook projecting from one end with its open end adjacent to the bar, and means for connecting the other end of the bar to a chain, &c., combined with a sleeve slidably supported upon the bar and its outer end adapted to close the open end of the hook, a spring-supported pin in said recess to form a stop for the inner end of the sleeve, the outer end of the pin being slotted, and an arm secured to said bar and projecting into said slot, substantially as set forth.

In testimony whereof I have signed my name to this specification in the presence of two subscribing witnesses.

SIMON RICE PATTEN.

Witnesses:
H. G. OGDEN, Jr.,
W. CLARENCE DUVALL.